United States Patent
Kastner et al.

(10) Patent No.: US 8,295,298 B2
(45) Date of Patent: Oct. 23, 2012

(54) DEVICE WITH ETHERNET SWITCH FUNCTION AND SINGLE ETHERNET CONNECTOR

(75) Inventors: Juergen Kastner, Linz (AT); Uwe Schnabel, Erfurt (DE)

(73) Assignee: HID Global GmbH (DE)

( * ) Notice: Subject to any disclaimer, the term of this patent is extended or adjusted under 35 U.S.C. 154(b) by 839 days.

(21) Appl. No.: 12/399,666

(22) Filed: Mar. 6, 2009

(65) Prior Publication Data

US 2009/0279554 A1 Nov. 12, 2009

Related U.S. Application Data

(60) Provisional application No. 61/051,137, filed on May 7, 2008.

(51) Int. Cl.
*H04L 12/28* (2006.01)

(52) U.S. Cl. .......... 370/419; 370/389; 370/400

(58) Field of Classification Search .......... None
See application file for complete search history.

(56) References Cited

U.S. PATENT DOCUMENTS

| | | | | |
|---|---|---|---|---|
| 6,775,283 | B1 * | 8/2004 | Williams | 370/392 |
| 7,009,933 | B2 * | 3/2006 | Gan | 370/226 |
| 7,103,035 | B1 * | 9/2006 | Kanuri | 370/356 |
| 2004/0067782 | A1 * | 4/2004 | Kagan et al. | 455/575.1 |
| 2004/0169654 | A1 * | 9/2004 | Walker et al. | 345/440 |
| 2004/0236726 | A1 * | 11/2004 | Ewing et al. | 707/3 |
| 2005/0213560 | A1 * | 9/2005 | Duvvury | 370/351 |
| 2007/0047525 | A1 * | 3/2007 | He | 370/352 |
| 2007/0147354 | A1 * | 6/2007 | He | 370/352 |
| 2007/0174492 | A1 * | 7/2007 | Light et al. | 709/250 |
| 2007/0288615 | A1 * | 12/2007 | Keohane et al. | 709/223 |
| 2008/0014879 | A1 * | 1/2008 | Light et al. | 455/130 |
| 2008/0062980 | A1 * | 3/2008 | Sunaga et al. | 370/389 |

OTHER PUBLICATIONS

Card Star Medic 2 Standardmodell 6220, Einfach mehr Zukunft, Celelectronic Berlin, www.celelectronic.de, 2 pages.

IEEE 802.3 Standard Abstract, available at http://www.ieeexplore.ieee.org/ISOL/standardstoc.jsp?punumber+4726157, accessed, Jun. 5, 2009, 1 page.

\* cited by examiner

*Primary Examiner* — Bob Phunkulh
(74) *Attorney, Agent, or Firm* — Sheridan Ross P.C.

(57) ABSTRACT

A Local Area Network (LAN) device is provided that includes an integrated switching function and a single network port. More specifically, the single network port of the LAN device may be used to provide communications over two different channels to/from two different external network devices. Thus, the LAN device may be utilized as an intermediary network device in a bus or chain network configuration even though it only comprises a single network port.

15 Claims, 3 Drawing Sheets

DEVICE WITH ETHERNET SWITCH FUNCTION AND SINGLE ETHERNET CONNECTOR

CROSS REFERENCE TO RELATED APPLICATIONS

This application claims the benefit of U.S. Provisional Application No. 61/051,137, filed May 7, 2008, the entire disclosure of which is hereby incorporated herein by reference.

FIELD OF THE INVENTION

The present invention is directed generally toward Local Area Network (LAN) technologies and more specifically directed toward devices that utilize Ethernet networking technologies.

STATE OF THE ART

A Local Area Network (LAN) is a computer network that covers a relatively small geographic area. LANs can be used to transmit data at much faster rates than telephone lines. However, the size of most LANs are limited by the cost of the cables used to build the LAN. Most LANs are contained within a building or group of closely located buildings. Different LANs that are separated by a relatively large distance can be connected together via telephone lines and wireless channels, thereby forming a Wide Area Network (WAN). Thus, a WAN can be global, connecting hundreds of branch offices and thousands of users.

LANs can link as few as three workstations or devices, but often link hundreds. A network device can execute its own programs, as well as access data and devices anywhere on the LAN. This means that many users can share expensive devices, such as laser printers, and communicate with each other.

Ethernet, Fiber Distributed Data Interface (FDDI), ARCNET, and Token Ring are different technologies that can be used to build a LAN, with Ethernet being the most common for PCs. LANs differ from one another in terms of topologies (bus, star, or ring), data transmission protocols, and physical media.

To create an "in series" (or bus) topology in an Ethernet LAN network, devices like PCs are often equipped with two Ethernet connectors (e.g., RJ45 ports) and an integrated switch element (e.g., a 100 MBit LAN PHY). Such a device configuration is also available in certain types of credential readers. One example of this type of device is the GK reader produced by Celectronic. The use of two integrated Ethernet connectors in a reader or other devices, however, are a drawback in terms of the additional size that is required for that device. More specifically, a device that includes two Ethernet ports is substantially larger than devices with only one Ethernet port given the space needed for the port. This is why most devices (e.g., laptops, PCs, etc.) only have one Ethernet port and thus are limited to being an end device in the LAN. The alternative being of installing and configuring an external switch device by each node of the LAN, what is not so easy to make for usual user. The solution with integrated and automatic switch function is much easier for users without special IT knowledge. For each Ethernet port in a two-port device, 4 of the 8 possible data lines are typically used, while the other four lines are terminated at the ground in a 100 Mbit architecture.

As can be seen in FIGS. 1 and 2, traditional intermediary LAN devices 1 in a bus configuration require two network ports 2, 2'. These prior art devices 1 typically include a physical interface (PHY) 3 that is primarily used to transform the analog modulated LAN signals from LAN wires 5 into a digital signal that can be interpreted and processed by an internal processor 4. The PHY 3 may also transform signal outbound digital signals generated by the processor 4 into analog form for transmission over the LAN wires 5.

The PHY 3 may also be adapted to transfer the analog signal received at the first network port 2 to the second network port 2' and vice versa. This is typically done when the received signal is not directed toward the device 1 that receives the signal. When an analog signal is forwarded, the PHY 3 does not typically transform the signal into a digital signal. Rather, the signal is forwarded in its analog format. This allows the device 1 to act as an intermediary device in the LAN with a relatively low processing overhead. To accomplish this forwarding task, however, several protocols and configurations may be required to be supported by each device 1, depending on the LAN architecture and LAN devices 1.

SUMMARY OF THE INVENTION

When LAN devices are used that include two network ports each port has its own mechanical connection with the magnetics for decoupling. In a 100 Mbit LAN, four of the eight possible data lines are used for each connection. The other four lines are terminated to GND and not used. This is a waste of the four available data lines that could potentially be used to transmit additional information.

Thus, in accordance with at least some embodiments of the present invention, a network device is provided that includes only one mechanical connection (e.g., a single network port such as an Ethernet port) and a switching function. The switching function may be provided in a PHY of the network device. The single port may be provided with 1 Gbit magnetics that allows all eight lines of the LAN wire (e.g., an Ethernet wire) to be available for data transmission (i.e., 4× twisted-pair lines). Although the port may be built to support the 1 Gbit connection, a 1 Gbit protocol is not necessarily used. This is because the traditional 1 Gbit protocol employs all eight lines for data communications on one channel. Rather, a portion of the signal lines (e.g., four of the eight signal lines) may be re-routed to support data communications on a first channel while the remaining signal lines (e.g., the other four signal lines) may be employed to support data communications on a second channel. The first and second channels may act as the input and output channels, respectively, for the network device.

In accordance with at least some embodiments of the present invention, the switching function of the network device may be used to transfer data received at the first channel for transmission out of the second channel. While both channels may be physically connected to the network device via the same network port, the first channel may carry data communications to an external first network device while the second channel may carry data communications to an external second different network device. Thus, the network device may be utilized as an intermediary network device in a bus configuration, thereby allowing the network device to be the destination of a data signal or a router of a data signal. This helps reduce the size of the network device and cost of the network device since it only requires a single network port.

In accordance with another embodiment of the present invention, a communications method is provided. The communications method generally comprising, receiving a data signal from a first network device at a first network port of a second network device and then determining whether the second network device is the destination network device. If the second network device is the destination network device, then the data signal may be forwarded to a processor of the second network device for processing. If, on the other hand, the second network device is not the destination network device, then the data signal may be forwarded to a third network device via the first network port.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

DETAILED DESCRIPTION

Figure 1:
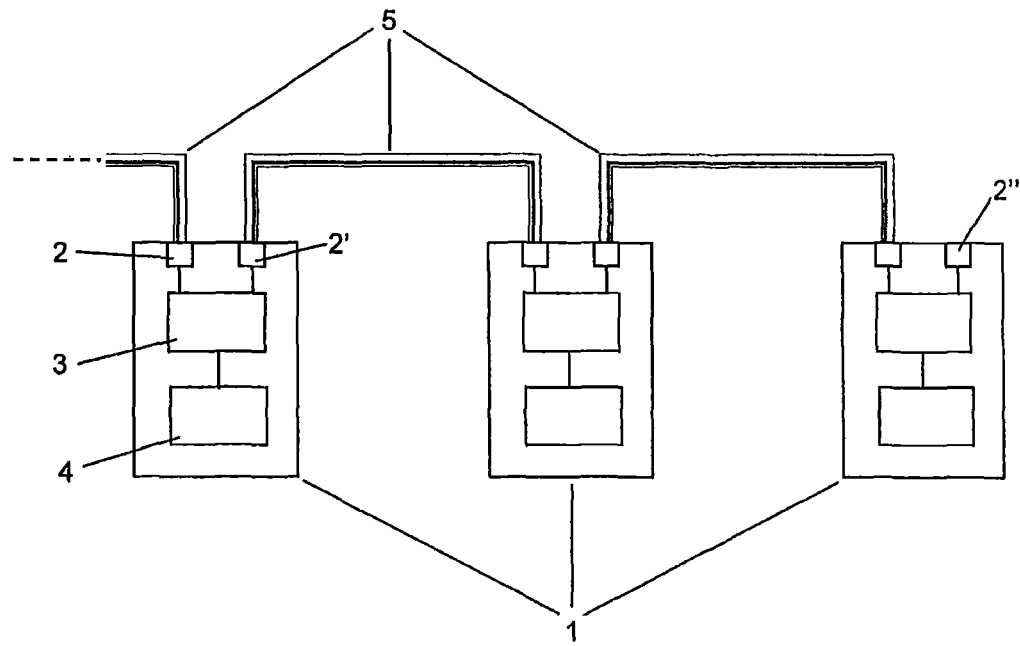
FIG. 1 shows a portion of a LAN in accordance with at least some embodiments of the prior art.
Figure 2:
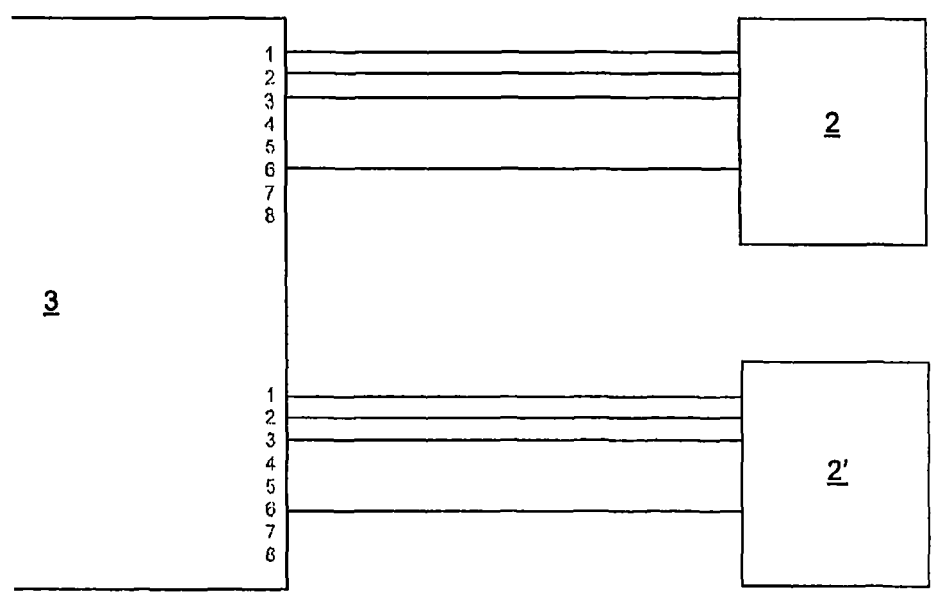
FIG. 2 shows a detailed view of a network device in accordance with at least some embodiments of the prior art.
Figure 3:
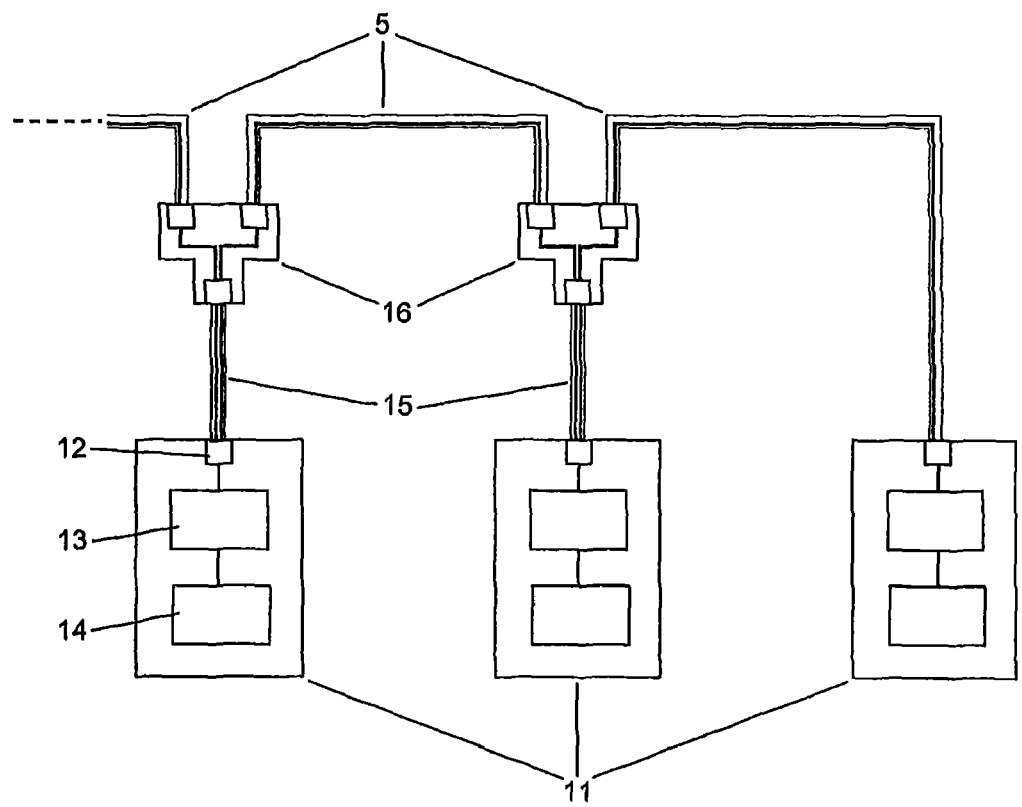
FIG. 3 shows a portion of a LAN in accordance with at least some embodiments of the present invention.

Referring now to FIG. 3, an exemplary communication network will be described in accordance with at least some embodiments of the present invention. The network may comprise a LAN or similar type of local network architecture. Alternatively, the network depicted may be connected to other LANs in a WAN type configuration. The communication network may comprise a plurality of network devices 11 that are in communication with one another through network cables 5, 15. The network cables 5, 15 may correspond to Ethernet cables in which case the network includes and Ethernet type LAN.

The network devices 11 may include any type of communication device that is compatible with the network. Examples of suitable network devices 11 include, but are not limited to, access control readers, financial machines, laptops, Personal Computers (PCs), and the like. The invention is particularly advantageous for compact/portable devices, by which the place and cost issue are of high importance. In accordance with at least one embodiment of the present invention, the network device 11 may be adapted to use a 100Base-TX Ethernet protocol. This means that the network device 11 may be adapted to transfer data at a maximum rate of 100 Mbit/sec along a copper cable (e.g., a cat-5 cable).

Data signals may be transmitted across the communication network in analog and/or digital form. Information may be carried by the data signals in the form of data packets. In the event that analog data transmission is utilized, then the data packets may be modulated on the analog signal. If digital data transmission is utilized, then the message may be transmitted as digital data packets. A data packet on the cable 5, 15 may also be referred to as a frame. In accordance with at least some embodiments of the present invention, a frame viewed on the cable 5, 15 would include such data as is defined in the IEEE 802.3 standard, the entire contents of which are hereby incorporated herein by this reference. In such an embodiment, the data packet may include a payload or message as well as Media Access Control (MAC) addresses for the source and destination network devices 11. Different frame types can, of course, be used and each may have different formats and Maximum Transmission Unit (MTU) values.

As can be seen in FIG. 3, the network devices 11 may either correspond to an intermediary device (i.e., a device that is connected to two network devices) or an endpoint (i.e., a device that is connected to only one network device) in the network. Regardless or whether the network device 11 is an endpoint or an intermediary device, and in accordance with at least some embodiments of the present invention, the network devices 11 may comprise a single network port 12. In an exemplary embodiment where Ethernet network cables 5, 15 are used, the network port 12 may correspond to an Ethernet port. As can be appreciated, however, different types of network ports may be utilized depending upon the network structure and type of cables used. The network devices 11 may also comprise a PHY 13 and a processor 14. The network port 12, PHY 13, connections there between, and components thereof are also generally referred to herein as a network interface. The network interface of the network device 11 may be adapted to receive data signals from one network device and transmit the received data signals to another network device. More specifically, the network device 11 may utilize the single network port 12 to receive data signals directed toward that network device 11 and/or forward data signals along the communication network to another network device.

To accomplish this feature, intermediary network devices 11 may be connected to the communication network via a splitter 16. The splitter 16 may correspond to a device that is external to the network device 11 that can be used to provide two connections to the network for the single network port 12. More specifically, the splitter 16 may comprise three ports. Each port may be associated with a different network device 11. For example, a first port of the splitter 16 may be connected to the single network port 12 of the intermediary network device 11 via a network cable 15.

The use of a splitter 16 instead of providing two network ports on the network device is advantageous for several reasons. First, the cost of such a splitter 16, which are commonly available on the market, is less than the cost of a network device that is equipped with two network ports. Additionally, the cost of the splitter 16 is only incurred when necessary, whereas the cost for a network device with two network ports is typically incurred regardless of whether that network device is going to be used as an intermediary device (where the two network ports would be necessary) or as an endpoint network device (where the two network ports are not necessary). Second, the size of the network device 11 with only a single network port 12 is substantially less than the size of a network device with two network ports. This increases the appeal of such network devices 11 as well as the places where the network devices 11 can be utilized. Additionally, the splitters 16 can be concealed in-wall or in other discrete places. Thus, the only wire that needs to be made externally available is the network cable 15 further reducing the amount of clutter caused by excess wires.

In accordance with at least some embodiments of the present invention, half of the lines in the network cable 15 may correspond to a first channel and the other half of the lines in the network cable 15 may correspond to a second channel. The first channel may be used by the intermediary network device 11 to communicate with a first external network device while the second channel may be used by the intermediary network device 11 to communicate with a second external network device. The other two ports of the splitter 16 may be used to physically separate the two channels on to two different network cables 5. More specifically, in embodiments where Ethernet cables 5, 15 are used, all eight of the lines of the cable 15 between the splitter 16 and the intermediary network device 11 may be used to carry data. The other network cables 5 that connect splitters 16 to one another and connect splitters 16 to an endpoint network devices may only utilize four of the eight lines to actually carry data. The other four lines of the network cable 5 may be grounded. This difference in used capacity is represented by a single bold line (for cables 5) and respectively double bold lines (for cables 15) inside of the network cables 5 and respectively 15.

The separation of channels at the intermediary network device 11 occurs at the network interface. More particularly, the single network port 12 may be connected to the PHY 13 via the two different channels. In accordance with at least some embodiments of the present invention, the PHY 13 may be provided with a switching function 17 that is capable of transferring data signals from one channel to the other channel as necessary, where each channel resides on the same network port 12 (and accordingly on cable 15). Thus, the switching function 17 may be adapted to receive a data signal from a first external network device on a first channel of the network port 12 and re-route that same signal to a second external network device on a second channel of the same network port 12.

Figure 4:
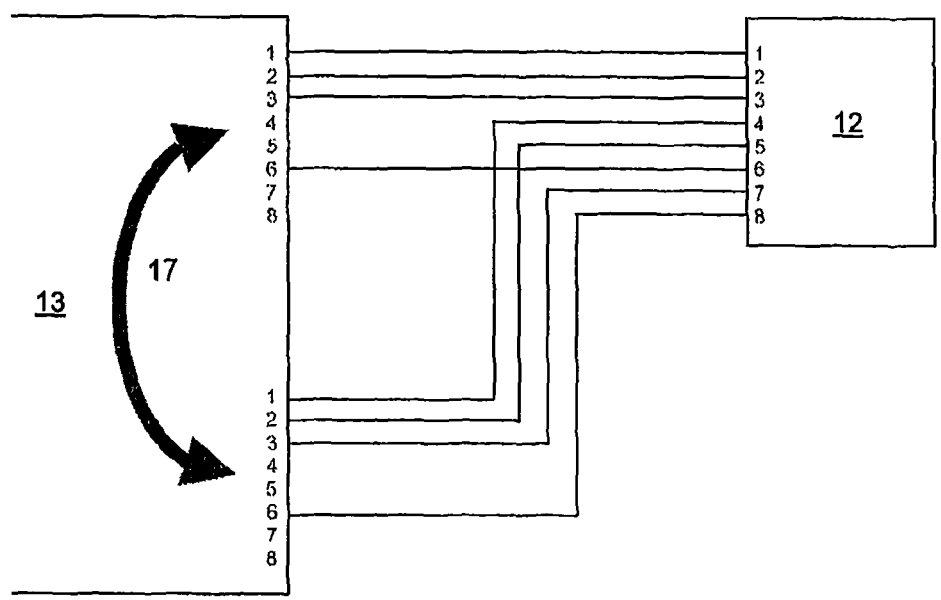
FIG. 4 shows a detailed view of a network device in accordance with at least some embodiments of the present invention.

The details of the connection between the PHY 13 and network port 12 can be seen in FIG. 4. In accordance with at least some embodiments of the present invention, the PHY 13 may comprise 16 possible lines that could be connected to the network port 12. Eight of those lines may correspond to the first channel of the PHY 13 and the other eight lines may correspond to the second channel of the PHY 13. Half of the lines (i.e., four) from the first channel of the PHY 13 may be connected to half of the lines of the network port 12 and half of the lines (i.e., four) from the second channel of the PHY 13 may be connected to the other half of the lines of the network port 12. Thus, there may be half of the lines from each channel in the PHY 13 that are not used in the connection between the PHY 13 and network port 12. These additional lines may be left unconnected or may be used for additional network connections. In accordance with at least one embodiment of the present invention, the single network port 12 may have 1 Gbit magnetics (100 Mbit magnetics are not used because only four lines in such a connection are used while the other four are terminated). All eight lines (four twisted pairs) are available for data transmission in the 1 Gbit connector. However, and in accordance with at least one embodiment of the present invention, a 1 Gbit Ethernet protocol is not used since such a protocol would have all eight lines be employed for one channel. Rather, the signal lines from both channels of the PHY 13 may be merged into the single physical connection of the network port 12 and a 100 Mbit protocol may be utilized. Accordingly, the network port 12 may utilize four of its eight lines for communicating via the first channel and the other four of its eight lines for communicating via the second channel.

Although the network interface has been described above in connection with details relating to the use of a 1 Gbit network port and 100 Mbit protocol, one skilled in the art will appreciate that advantages of the present invention can also be realized by using different types of network ports and/or protocols. The description above is not meant, in any way, to limit the scope of the invention. For example, it is conceivable that a terabit-type physical connection can be used along with a gigabit-type protocol. Other alternative configurations will also become readily apparent to those skilled in the art after reviewing this disclosure.

In accordance with at least some embodiments of the present invention, the network devices 11 may also be utilized in a network architecture that employs Power over Ethernet (PoE). More specifically, a non-PoE device (such as the network device 11 that includes its own power supply) may be connected to a network that is distributing PoE. In such an embodiment, the PoE system may be adapted to check the device capabilities before a higher current (i.e., PoE) is sent to the device. Thus, a low-power consumption network device 11 that does not require PoE would not be unilaterally provided with PoE unless it was desired.

Figure 5:
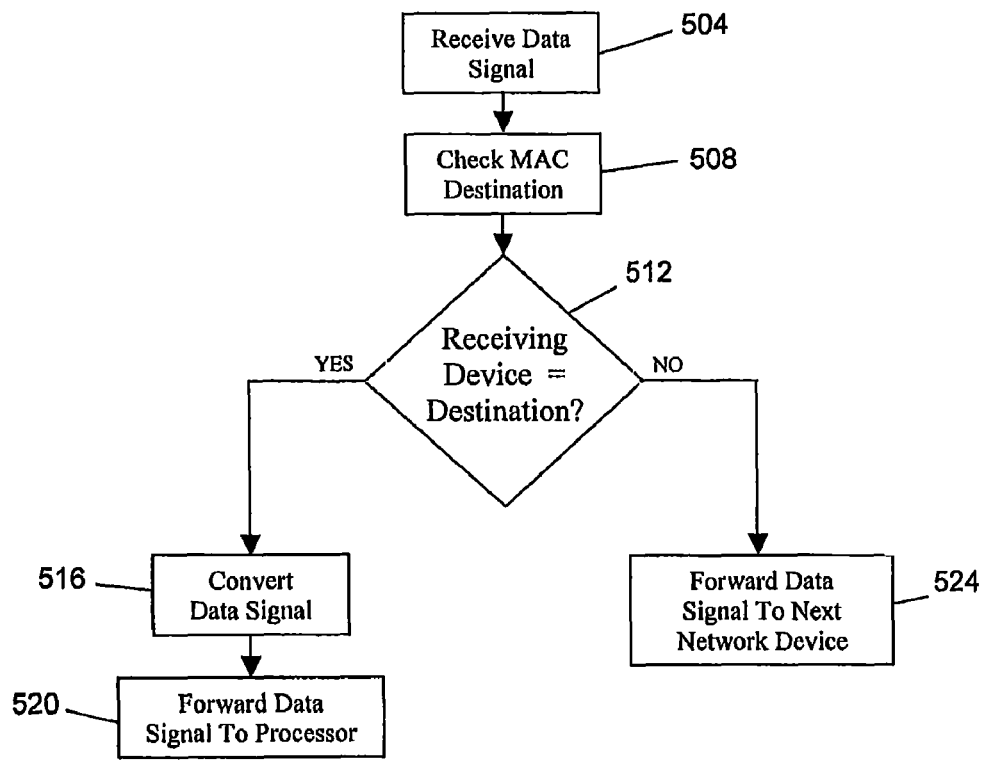
FIG. 5 shows a flow diagram of a routing method in accordance with at least some embodiments of the present invention.

Referring now to FIG. 5, a communication method will be described in accordance with at least some embodiments of the present invention. The method is initiated when a data signal is received at a network device 11 (step 504). The receipt of the data signal may occur at a first channel of the PHY 13 and the data signal may have been transmitted to the recipient network device 11 from a first external network device.

When the data signal is received at the PHY 13, the contents of the data signal are analyzed to determine the intended destination of the data signal (step 508). More particularly, the PHY 13 may analyze the destination MAC address defined in the data signal. Upon analyzing the destination MAC address of the data signal, the PHY 13 may determine whether the destination MAC address corresponds to the MAC address of the recipient network device 11 (step 512). If the destination MAC address corresponds to the MAC address of the recipient network device 11, then the message in the data signal has reached its destination. At this point the method continues with the PHY 13 converting the data signal into a suitable format for the processor 14 (step 516). More specifically, if an analog data signal was received, then the PHY 13 may convert the data signal into a digital data signal for processing by the processor. After the signal has been converted or if a data signal was received that did not require conversion, then the PHY 13 may forward the data signal to the processor 14 for processing (step 520). In addition to forwarding the signal, the PHY 13 may also strip off unnecessary portions (e.g., the MAC header or portions of the MAC header) of the message before forwarding it to the processor 14.

Referring back to step 512, if the destination MAC address of the received data signal does not equal the MAC address of the recipient network device 11, then the PHY 13 will utilize the switching function 17 to transfer the data signal from the first channel of the PHY 13 to the second channel of the PHY 13. This allows the switching function 17 to forward the data signal to a second external network device (step 524). The forwarding is performed via the same network port 12 on which the data signal was received. The only difference is that the data signal is transmitted on a different channel from which it was received.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using procedural or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for receiving and forwarding network communications to/from different network devices via the same network port. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

| List of numerical references: | |
|---|---|
| 1 | device |
| 2 | network port(s) |
| 3 | physical interface (PHY) |
| 4 | processor |
| 5 | network wire/cable |
| 11 | device according to embodiments of the invention |
| 12 | single network port |
| 13 | physical interface (PHY) |
| 14 | processor |
| 15 | network wire/cable |
| 16 | splitter |
| 17 | switching function |

The invention claimed is:

1. An electronic device, comprising:
a processor; and
a network interface, comprising a network port comprising a plurality of lines and a physical interface comprising a first and second channels, each comprising a plurality of lines, wherein the physical interface comprises a switching function, the physical interface being operable to forward data signals received at the network port from a first external network device and addressed to the electronic device to the processor and being operable to utilize the switching function to forward data signals received at the network port from the first external network device and not addressed to the electronic device to a second external network device via the network port, and wherein the first channel of the physical interface is associated with the first external network device and the second channel of the physical interface is associated with the second external network device, wherein half of the lines of the network port are connected to at least some of the lines of the first channel and wherein the second half of the lines of the network port are connected to at least some of the lines of the second channel.

2. The electronic device of claim 1, wherein the data signals received at the network port comprise an analog modulated signal and wherein the physical interface is further operable to transform the received data signal into a digital signal when forwarding the data signal to the processor.

3. The electronic device of claim 1, wherein the switching function is operable to redirect data signals received at the first channel to the second channel and wherein the switching function is operable to redirect data signals received at the second channel to the first channel.

4. The electronic device of claim 1, wherein the network port comprises an Ethernet connector that includes eight lines, wherein a first set of four lines of the Ethernet connector are connected to a first set of four lines of the first channel and wherein a second set of four lines of the Ethernet connector are connected to a second set of four lines of the second channel.

5. The electronic device of claim 4, wherein the first set of four lines of the Ethernet connector are used to transfer data signals to and from the first external network device and wherein the second set of four lines of the Ethernet connector are used to transfer data signals to and from the second external network device.

6. The electronic device of claim 1, wherein the network interface is connected to the first external network device through a first channel of an external splitter and wherein the network interface is connected to the second external network device through a second channel of the external splitter.

7. The electronic device of claim 1, wherein the switching function is operable to compare a destination address of received data signals with an address associated with the electronic device to determine whether the data signal is addressed to the electronic device.

8. The electronic device of claim 1, wherein the electronic device comprises an access control reader.

9. The electronic device of claim 1, wherein the electronic device comprises at least one of a laptop and Personal Computer (PC).

10. A communication method, comprising:
receiving a data signal from a first network device at a network port of a second network device;
determining that the second network device is not the destination network device for the data signal; and
forwarding the data signal to a third network device via the network port, wherein the data signal is received from the first network device on a first channel and forwarded to the third network device on a second different channel, wherein both of the first and second channels pass through the network port, wherein the network port comprises a plurality of lines, wherein half of the lines of the network port are used for the first channel and wherein the second half of the lines of the network port are used for the second channel.

11. The method of claim 10, further comprising:
receiving a second data signal from the first network device at the network port;
determining that the second network device is the destination network device for the second data signal; and
forwarding the second data signal to a processor of the second network device for processing.

12. The method of claim 11, wherein the second data signal comprises an analog modulated signal, the method further comprising:
transforming the second data signal into a digital signal prior to forwarding the second data signal to the processor.

13. The method of claim 10, wherein the network port comprises an Ethernet connector that includes eight lines.

14. The method of claim 10, wherein the network port is connected to the first network device through a first channel of an external splitter and wherein the network port is connected to the third network device through a second channel of the external splitter.

15. The method of claim 10, wherein the second network device comprises at least one of an access control reader, a laptop, and Personal Computer (PC).

* * * * *